United States Patent [19]

Gerhard

[11] Patent Number: 4,916,568
[45] Date of Patent: Apr. 10, 1990

[54] DECK FOR A RECORDING AND/OR REPRODUCING APPARATUS

[75] Inventor: Bürgmann Gerhard, Vienna, Austria

[73] Assignee: U.S. Philips Corporation, New York, N.Y.

[21] Appl. No.: 234,022

[22] Filed: Aug. 19, 1988

[30] Foreign Application Priority Data

Oct. 19, 1987 [AT] Austria ................................ 2757/87

[51] Int. Cl.⁴ ............................................ G11B 15/00
[52] U.S. Cl. .................................................... 360/137
[58] Field of Search ...................... 360/137, 96.1–96.6; 242/197–200

[56] References Cited

U.S. PATENT DOCUMENTS 4,404,610  9/1983  Koizumi ............................. 360/137
4,757,413  7/1988  Veigl ................................... 360/137

Primary Examiner—A. J. Heinz
Attorney, Agent; or Firm—Brain J. Wieghaus

[57] ABSTRACT

In a deck (1) for a recording and/or reproducing apparatus, comprising a set (25) of three adjacent push-buttons (26, 27, 28) whose three juxtaposed axially guided push-button slides (32, 33, 34) cooperate with a latching member (48) which is guided so as to be movable transversely of the push-button slides, only one spring (61) acts on is common to two push-button slides (32, 34) and only one further spring (62) acts on and is common to the third push-button slide (33) and the latching member (48).

3 Claims, 1 Drawing Sheet

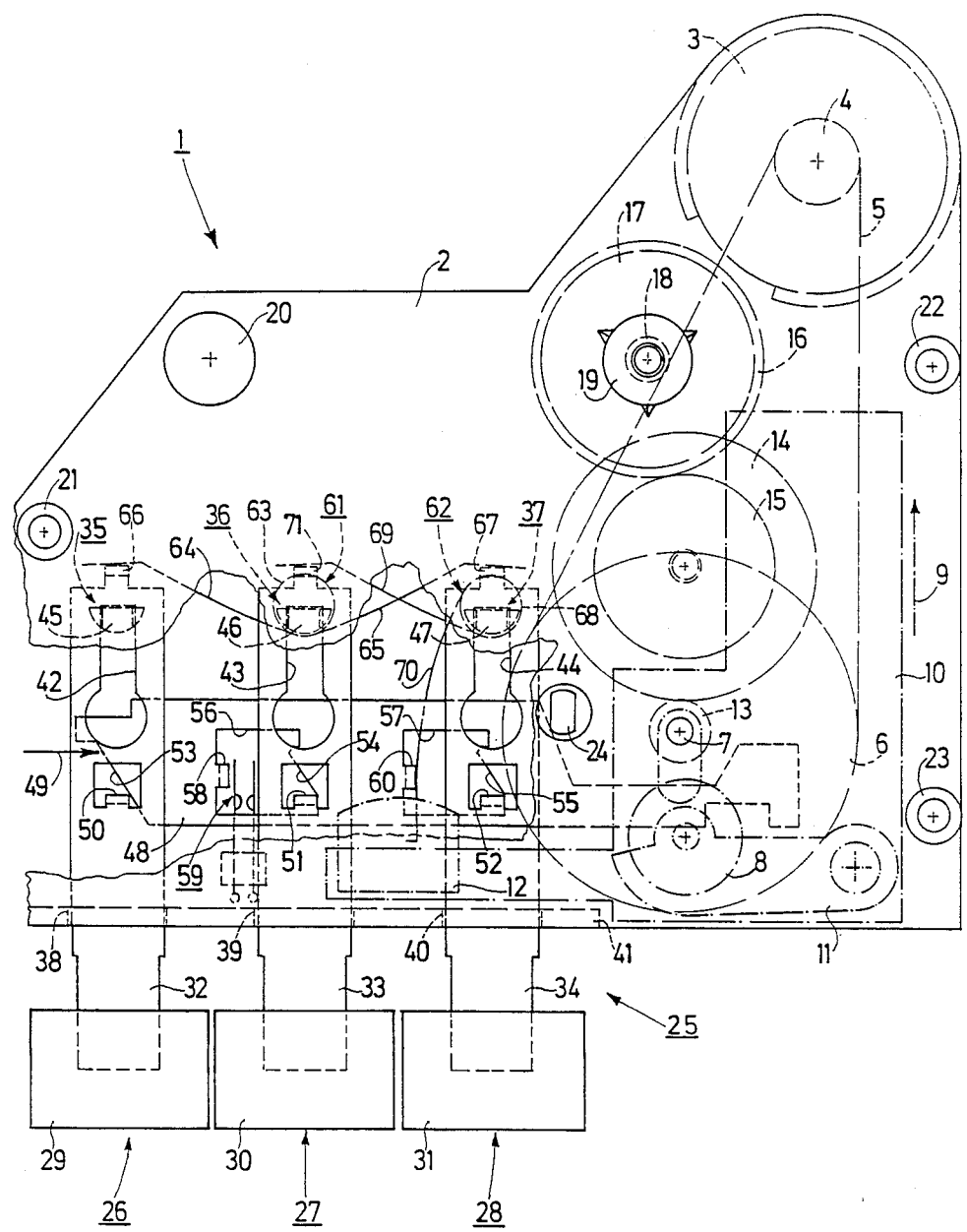

DECK FOR A RECORDING AND/OR REPRODUCING APPARATUS

The invention relates to a deck for a recording and-/or reproducing apparatus, comprising a set of push-buttons for selecting the modes of operation of the apparatus, which set comprises three adjacent push-buttons whose juxtaposed push-button slides are each axially guided by a guide means, movable from an off-position to an on-position against the force of springs acting on them and cooperate with a latching member which is guided so as to movable transversely of the push-button slides and, when a push-button is actuated, is moved out of a rest position against the force of a spring acting on said member, one spring acting on and being common to two of the three push-button slides.

In a commercially available prior-art deck of this type a first spring, which has two free spring ends and which abuts against a separate first pin, acts on one of the two outer push-button slides and on the central push-button slide with a respective one of its two spring ends, a second spring, which has two free springs ends and which abuts against a separate second pin, acts on the outer push-button slide with one of its spring ends, which slide is constructed as a mounting plate for at least one magnetic head, and a third spring, which has two free spring ends and which abuts against a separate third pin, acts on the latching member with one of its spring ends to reset the three push-button slides to their off-positions and the latching member to its rest position. Thus, three springs in total are provided to reset the three push-button slides and the latching member.

It is the object of the invention to provide a deck of the type defined in the opening paragraph, whose construction is simplified in comparison with the prior-art deck. To this end the invention is characterized in that a further spring, which is common to the third push-button slide and the latching member, acts on the third push-button slide and on the latching member. In this way it is achieved that the three push-button slides and the latching member can be reset by means of only two springs. This results in a simpler construction with a minimal number of springs, which leads to less assembly work and reduced production costs.

The two springs can abut against separate pins, in the same way as in said prior-art deck. However, it is found to be advantageous if the guide means for each push-button slide comprises a stationary guide pin which engages a slot formed in the relevant push-button slide, if the spring which is common to the two push-button slides abuts against the guide pin for the central push-button slide and acts on the two outer push-button slides, and if the further spring, which is common to the third push-button slide and the latching member, abuts against the guide pin for that outer push-button slide towards which the latching member moves upon actuation of a push-button, said further spring acting on the central push-button slide and on the latching member. In this way two of the guide pins used for guiding the push-button slides are also used for the abutment of the two springs, so that separate abutment pins may be dispensed with.

The springs which abut against the guide pins may be, for example, leaf springs inserted in mounting slots on the guide pins. However, it is found to be very advantageous if the two springs are spiral leg springs whose central turns are slid onto the guide pins. In this way it is achieved that no separate provisions on the guide pins are needed to enable the springs to abut against said pins, because the spiral leg springs simply surround the guide pins with their central turns.

An embodiment of the invention will now be described in more detail, by way of example, with reference to the accompanying drawing. The sole FIGURE of the drawing is a plan view to substantially twice full-scale of the relevant part of a deck for a reproducing apparatus for a magnetic tape accommodated in a cassette.

The FIGURE shows a deck 1 for a reproducing apparatus for the reproduction of audio signals from a magnetic tape accommodated in a cassette, not shown, and generally referred to as a Compact cassette. The deck 1 comprises a generally planar plastics chassis 2 carrying the various parts of the deck. A motor 3 is secured to the chassis 2 and can drive a pulley 4 mounted on its motor shaft and, via a belt 5, a flywheel 6. A capstan 7, which is rotatably journalled in the chassis and which extends through the chassis, is coaxially connected to the flywheel 6 and can driven with a constant speed by the motor 5 to drive the magnetic tape, not shown, with a constant speed in conjunction with a pressure roller 8, which can be pressed resiliently against the capstan 7 in known manner.

The pressure roller 8 is pivotally mounted on a support 10 by means of a pivotal lever 11, which support is arranged on the upper side of the chassis 2 and is movable from a rest position, shown in the Figure, into an operating position, not shown, in the direction indicated by the arrow 9. The support 10 further carries a magnetic reproducing head 12. The support 10 and the parts arranged on the support are only shown diagrammatically in dash-dot lines, because they are not relevant to the invention and to simplify and clarify the drawing. When the support 10 is set to its operating position the pressure roller 8 is pressed against the capstan 7 under spring load and the magnetic reproducing head 12 enters into cooperation with the magnetic tape in the cassette, thus causing the audio signals on the magnetic tape to be reproduced by means of the magnetic reproducing head 12.

A coaxial gear wheel 13 is pressed on the capstan 7. An intermediate gear wheel 14, which is mounted for rotation on the chassis 12, is permanently in mesh with the gear wheel 13 and is integrally connected to a coaxial further intermediate gear wheel 15. The further intermediate gear wheel 15 is permanently in mesh with a driving gear wheel 16, which is mounted for rotation on the chassis 2 and which can drive a coaxial wheel 17 via a friction clutch, not shown. The wheel 17 is coupled to a take-up mandrel 19 via a sleeve 18 which extends through the chassis 2, which mandrel can rotate a reel hub in the cassette to drive the magnetic tape in the cassette and wind it onto the take-up reel hub. The deck 1 does not comprise a supply mandrel which can cooperate with a supply reel hub in the cassette, but the supply reel hub cooperates with a locating pin 20 mounted on the chassis 2 to locate said supply reel hub in a radial direction. The locating pin 20 need not to be arranged on the chassis 2 but may also be arranged inside the apparatus, enabling the part of the chassis 2 carrying the locating pin to be dispensed with, so that material is saved and additional space becomes available, which can be utilized, for example, for batteries. The chassis 2 carries three mounting sleeves 21, 22 ad 23 for the passage of screws for securing the chassis 2 in an apparatus. The chassis 2 further carries two locating pins for positioning a cassette on the chassis, only one of said locating pins 24 being shown in the Figure, because the other locating pin is arranged on the cut-away part of the chassis.

For selecting the modes of operation of the apparatus the deck 1 comprises a set 25 of three adjacent push-buttons 26, 27 and 28 whose buttons 29, 30 and 31 adjoin each other. The three push-buttons 26, 27 and 28 comprise three adjacent push-button slides 32, 33 and 34, which are each axially guided by a guide means 35, 36 and 37 respectively and which are movable from an off-position shown in the Figure to an on-position, not shown, in the direction indicated by the arrow 9, opposed by the force of springs acting on them. The guide means 35, 36 and 37 each have a slot 38, 39 and 40 respectively in a strip-shaped portion 41 which is offset from the chassis 2 and a stationary guide pin 45, 46 and 47 respectively which engages a slot 42, 43 and 44 respectively in the relevant push-button slide 32, 33 or 34. Each guide pin 45, 46 and 47 comprises an end portion which engages over the relevant push-button slide 32, 33 or 34 and during mounting of the push-button slides is passed through a circular end portion of the relevant slot 42, 43 or 44 to retain the relevant push-button slide relative to the chassis 2.

The push-button slides 32, 33 and 34 cooperate with a latching member 48 which is guided to be movable transversely of the push-button slides by means of pin-and-slot joints, not shown, and which upon actuation of a push-button 26, 27 or 28 is moved out of the rest position shown in the Figure in the direction indicated by the arrow 49 against the force of a spring acting on the latching member 48. For this purpose each push-button slide 32, 33 or 34 comprises a transverse projection 50, 51 and 52 respectively, each of which cooperates with an at least partly inclined cam surface 53, 54 or 55 on the latching member 48. The two cam surfaces 54 and 55 are each formed in an opening 56 and 57 respectively in the latching member 48. The rest position of the latching member 48, as shown in the Figure, is defined in that at least one of the cam surfaces 53, 54 and 55 is urged against the relevant projection 50, 51 or 52 under the influence of the spring which acts on the latching member 48.

At the location of the opening 56 the latching member 48 comprises a transverse projection 58 by means of which a switch 59, shown diagrammatically, can be closed when the latching member 48 moves out of its rest position in the direction indicated by the arrow 49. The switch 59 is arranged in the circuit of the motor 3, so that if the switch 59 is closed the motor 3 is energised to drive the capstan 7 via the belt drive 4, 5, 6 and the take-up mandrel 19 via the gear drive 13, 14, 15, 16, 17, 18, as a result of which the magnetic tape is also driven. At the location of the opening 57 the latching member 48 comprises a transverse projection 60 against which the spring acting on the latching member 48 abuts. The end of the latching member 48 near the flywheel 6 is constructed to cooperate with a stop device, which is not shown for the sake of simplicity, and which when the end of the magnetic tape is reached automatically moves the latching member 48 in the direction indicated by the arrow 49 to release a push-button which is locked by the latching member and thereby switch off the mode of operation selected by means of said push-button.

The push-button 28 serves for selecting the "normal forward" mode. When it is set to its on-position, in which it is retained by the cam surface 55 via the projection 52, the support 10 is moved to its operating position in the direction indicated by the arrow 9 via an actuating means, not shown, in which position the magnetic reproducing head 12 is in contact with the magnetic tape in the cassette and the pressure roller 8 is pressed against the capstan 7 under spring load. Since the latching member 48 is moved out of its rest position when the key 28 is actuated, the switch 59 is closed via the projection 58 and the motor 2, as already stated, drives the capstan 7 and the take-up mandrel 19, so that when the pressure roller 8 is pressed against the capstan 7 the magnetic tape is driven with a constant speed to reproduce the recorded audio signals. The push-button 27 serves for selecting the "fast forward" mode. When the push button 27 is set to its on-position, in which it is retained by the cam surface 54 via the projection 51, the support 10 is not moved, but the switch 59 is closed via the latching member 48. The motor 3 then also drives the capstan 7 and the take-up mandrel 19 but without the pressure roller 8 being pressed against the capstan 7, so that the magnetic tape is now only driven by the take-up mandrel 19, the friction clutch arranged between the driving gear wheel 16 and the wheel 17 remaining inoperative, which causes the magnetic tape to be driven with a higher speed. The push-button 26 serves for selecting the "stop" mode and when it is actuated the latching member 48 is moved in the direction indicated by the arrow 49 and if one of the two other push-buttons 27 or 28 is locked by means of the latching member it is released to switch off the relevant mode of operation.

As can be seen from the Figure, only one spring 61 acts on two of the three push-button slides, namely on the two outer slides 32 and 34, so that the spring is common to these two push-buttons. Only one further spring 62, which is common to the slide 33 and the latching member 48, acts on the third, i.e. the central, push-button slide 33 and on the latching member 48. In this way it is achieved that for loading the three push-button slides 32, 33 and 34 and the latching member 48 only two springs 61 and 62 are needed. The two springs 61 and 62 are constituted by spiral springs having two legs. The spiral spring 61, which is common to the two outer push-button slides 32 and 34, is slid with its wound central portion 63 onto the guide pin 46 for the central push-button slide 33 and is thus constrained by said guide pin 46, its two spring legs 64 and 65 each acting on a projection 66 and 67 on the two outer push-button slides 32 and 34 respectively. The spring 62, which is common to the central push-button slide 33 and the latching member 48, is slid with its wound central portion 68 onto the guide pin 47 for that outer push-button slide 34 towards which the latching member 48 is moved, as is indicated by the arrow 49, when a push-button 26, 27 or 28 is actuated and in this way it is constrained by the guide pin 47, its two spring legs 69 and 70 acting on a transverse projection 71 on the central push-button slide 33 and on a transverse projection 60 on the latching member 48 at the location of the opening 57. In this way the two guide pins 46 and 47, which serve for guiding the push-button slides 33 and 34, are also used for anchoring the two springs 61 and 62. The two springs bland 62 can be mounted simply by sliding their central turns 63 and 68 onto the guide pins 46 and 47. Since the springs 61 and 62 are simply fitted around the guide pins 46 and 47 with their central turns 63 and 68, this means that in fact no further provisions are necessary to retain the springs in their mounted positions.

The deck described in the foregoing is intended for use in an apparatus by means of which audio signals can only be reproduced; such an apparatus is generally known as a "walkman". Obviously, a deck constructed in accordance with the invention can also be employed in an apparatus which is constructed not only for reproducing but also for recording audio signals, in which case instead of a magnetic reproducing head a magnetic recording/reproducing head and a separate switch for selecting the "recording" mode are provided.

What is claimed is:

1. A deck for a recording and/or reproducing apparatus, comprising a set of push-buttons for selecting the modes of operation of the apparatus, which set comprises three adjacent push-buttons whose juxtaposed push-button slides are each axially guided by a guide means, are movable from an off-position to an on-position against the force of springs acting on them and cooperate with a latching member which is guided so as to movable transversely of the push-button slides and, when a push-button is actuated, is moved out of a rest position against the force of a spring acting on said member, one spring acting on and being common to two of the three push-button slides, characterized in that a further spring, which is common to the third push-button slide and the latching member, acts on the third push-button slide and on the latching member.

2. A deck as claimed in claim 1, characterized in that the guide means for each push-button slide comprises a stationary guide pin which engages a slot formed in the relevant push-button slide, in that the spring which is common to the two push-button slides abuts against the guide pin for the central push-button slide and acts on the two outer push-button slides, and in that the further spring, which is common to the third push-button slide and the latching member, abuts against the guide pin for that outer push-button slide towards which the latching member moves upon activation of a push-button, said further spring acting on the central push-button slide and on the latching member.

3. A deck as claimed in claim 2, characterized in that the two springs are spiral leg pins whose central turns are slid onto the guide pins.

* * * * *